United States Patent [19]

Moore, Jr. et al.

[11] E Re. 29,870

[45] Reissued Dec. 26, 1978

[54] APPARATUS FOR INSTALLING AND REMOVING FLOW VALVES

[75] Inventors: Howard H. Moore, Jr., Weimar, Tex.; Harold E. McGowen, Jr., deceased, late of Houston, Tex., by Wanda E. L. McGowen, executrix, Longview, Tex.

[73] Assignees: Sid W. Richardson Foundation; Perry R. Bass, Inc., both of Fort Worth, Tex.; a part interest to each

[21] Appl. No.: 687,158

[22] Filed: May 17, 1976

Related U.S. Patent Documents

Reissue of:

[64] Patent No.: 3,827,490
Issued: Aug. 6, 1974
Appl. No.: 95,408
Filed: Dec. 4, 1970

U.S. Applications:

[63] Continuation-in-part of Ser. No. 725,637, May 1, 1968, abandoned, and a continuation-in-part of Ser. No. 864,260, Sept. 18, 1969, abandoned.

[51] Int. Cl.[2] ..... E21B 23/00
[52] U.S. Cl. ..... 166/117.5
[58] Field of Search ..... 166/117.5

[56] References Cited

U.S. PATENT DOCUMENTS

| | | | |
|---|---|---|---|
| 2,828,698 | 4/1958 | Bryan | 166/117.5 |
| 2,942,671 | 6/1960 | Schramm | 166/117.5 |
| 2,948,341 | 8/1960 | Fredd | 166/117.5 |
| 2,988,146 | 6/1971 | Fredd | 166/117.5 |
| 3,353,607 | 11/1967 | Kinley | 166/117.5 |
| 3,353,608 | 11/1967 | Beebe et al. | 166/117.5 |

*Primary Examiner*—Ernest R. Purser
*Attorney, Agent, or Firm*—Fulbright & Jaworski

[57] ABSTRACT

An apparatus for installing and removing flow valves in a well tubing having a plurality of valve receiving side pockets offset from the main bore by providing an orientation sleeve for directing a guide key of a valve handling apparatus in the sleeve, and a shoulder in the sleeve for actuation of the valve handling apparatus. A valve handling apparatus including a support body supporting a longitudinally movable body which includes a guide key pivotally connected at its lower end and yieldably urged outwardly by spring means so that the guide key will readily pass downwardly through any number of orientation sleeves and can selectively install or remove a valve in or from any desired vertically positioned mandrel.

18 Claims, 14 Drawing Figures

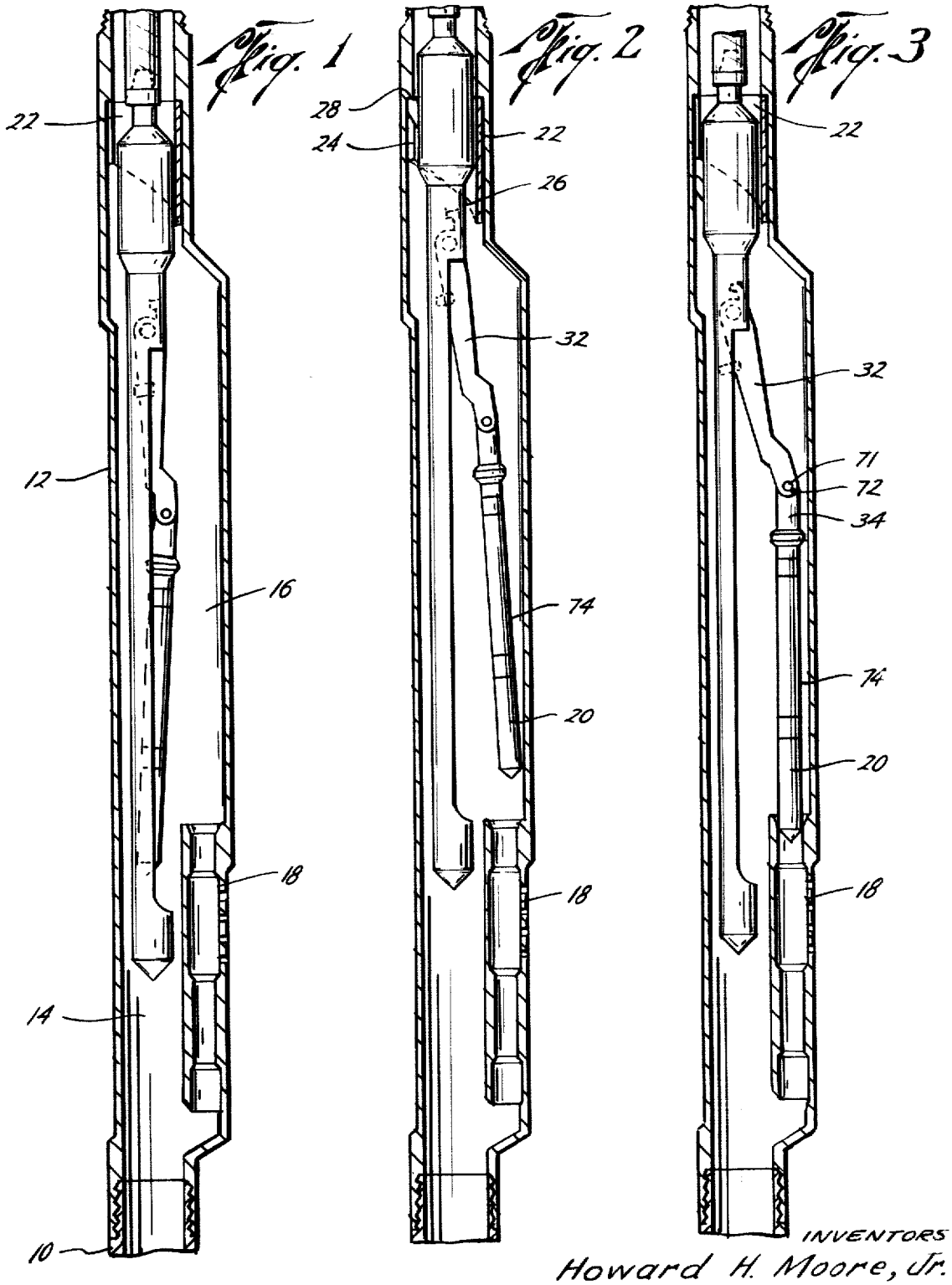
INVENTORS
Howard H. Moore, Jr.
Harold E. McGowen, Jr.
BY James F. Weiler
William A. Stout
ATTORNEYS INVENTORS
Howard H. Moore, Jr.
Harold E. McGowen, Jr.

BY James F. Weiler
William A. Stout

ATTORNEYS

INVENTORS
Howard H. Moore, Jr.
Harold E. McGowen, Jr.
BY James L. Wiley
William A. Stout
ATTORNEYS INVENTORS
Howard H. Moore, Jr.
Harold E. McGowen, Jr.
BY James F. Wiley
William A. Stout
ATTORNEYS Howard H. Moore, Jr.
Harold E. McGowen, Jr.
INVENTORS BY James F. Weiler
William G. Stout
ATTORNEYS Howard H. Moore, Jr.
Harold E. McGowen, Jr.
INVENTORS BY James A. Taylor
William A. Stout

ATTORNEYS

APPARATUS FOR INSTALLING AND REMOVING FLOW VALVES

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of an earlier filed copending application entitled "Apparatus for Installing and Removing Flow Valves," Ser. No. 725,637, filed May 1, 1968, now abandoned, and is a continuation-in-part of copending application Ser. No. 864,260, filed Sept. 18, 1969, now abandoned.

BACKGROUND OF THE INVENTION

The present invention relates to an apparatus for installing and/or removing flow valves and the like in a selected mandrel in a well tubing having a plurality of tubing mandrels vertically spaced therein and including means for orientating the valve handling apparatus with the valve seat in the offset pocket of the mandrel.

Generally, it is old as shown in U.S. Pat. No. 3,353,608 to provide a valve handling apparatus which is adapted to install or remove a flow valve in a well tubing having a plurality of vertically positioned tubing mandrels. A tubing mandrel includes a main bore therethrough in line with the bore of the well tubing and a side pocket offset from the main bore having a valve seat therein. In addition, it is old, as shown by U.S. Pat. Nos. 2,942,671, 2,988,146; and 2,948,341 to provide an orientation sleeve in the main bore for angularly positioning the valve handling apparatus relative to the side pocket for directing the valve handling apparatus into the offset pocket. The present invention is directed to improvements in apparatus for installing and removing flow valves which are oriented for directing the valve handling support into the side pocket of the mandrel and in which the installing or removing operation may be selectively provided in any of the desired vertically spaced mandrels in which all the vertically aligned tubing mandrels are alike in structure thereby providing a simplification in manufacture, in stocking of the equipment, and a simplification in operation.

SUMMARY

The present invention is directed to a well installation by providing improvements in an apparatus for installing and removing flow valves in a well tubing which has a plurality of vertically spaced tubing mandrels by providing improved means for selectively actuating a valve handling apparatus in any one of the vertically positioned mandrels while orientating and aligning the valve handling apparatus with respect to the offset pocket of the mandrel.

It is an object of the present invention to provide a plurality of tubing mandrels each having an orientation sleeve mounted in the main bore of the tubing mandrel having a longitudinally directed slot angularly spaced from the axis of the offset pocket a predetermined amount for coacting with a guide key of a valve handling apparatus having a guide surface positioned below the slot and directed upwardly and inwardly towards the bottom of the slot for guiding the key into the slot and an actuation shoulder positioned extending across the slot for preventing upward movement of the key through the slot and for actuating the valve handling apparatus.

A still further object of the present invention is the provision of a valve handling apparatus for coacting with an orientation sleeve by providing a support body adapted to be moved through the tubing and mandrels by any conventional means such as by hydraulic pump or by a wire line, a longitudinally movable body carried by the support body and having a longitudinal guide key having an upwardly directed shoulder and a downwardly facing taper and pivotally and releasably carried at its lower end and yieldably urged outwardly from the movable body whereby the guide key will readily pass downwardly through any number of orientation sleeves to the desired mandrel but upward movement will engage the first slot and shoulder encountered for orientating and actuating the valve handling apparatus.

Still a further object is the provision of an improved well handling apparatus in which spring means are provided for yieldably urging the guide key outwardly for engagement in the slot of the desired orientation sleeve and a recess is provided in the movable body for receiving the guide key when the shear pin supporting the key is broken upon upward release of the apparatus after installing or removing the desired flow valve.

Yet a further object of the present invention is the provision of a well valve handling apparatus for use in placing a valve or removing a valve from a desired side pocket in a tubing mandrel having a support body, a shifting tool pivotally supported from the support body and adapted to support a valve, a movable body carried by the support body having a guide key pivotally secured to the movable body at the lower end of the key by a shear pin, which key is adapted to coact with an orientation slot in the tubing mandrel, spring means yieldably urging the guide key outwardly for engagement into the orientation slot but allowing the key to downwardly bypass sleeves above the desired location, releasing means on the movable body initially holding the shifting tool aligned in the main bore but releasable on upward movement of the support body relative to the movable body when the guide key is contacting a shoulder in the orientation sleeve of the mandrel, and shifting means connected to the shifting tool for moving the tool into the side pocket when the releasing means is actuated.

Another further object of the present invention is the provision of a modified well handling apparatus for use in installing or removing valves from a selected mandrel in which the apparatus can be moved upwardly as well as downwardly through a plurality of mandrels each having an orientation sleeve. The modified apparatus includes a movable body carried by and longitudinally movable relative to the support body with a guide key pivotally connected to the movable body and having spring means urging the key outwardly to allow the key to downwardly bypass orientation sleeves above the desired location. A key retracting shoulder on the support body is provided for retracting the key so that the apparatus can be moved upwardly to be selectively actuated and orientated in any desired uphole mandrel and a spring is provided between the movable body and the support body for resetting the key by yieldably urging the key out of contact with the retracting shoulder.

BRIEF DESCRIPTION OF THE DRAWINGS

FIG. 1 is an elevational view, partly in cross section, illustrating the present invention as it is being lowered in a well tubing adjacent a valve seat in an offset pocket of a tubing mandrel for installing a flow valve, FIG. 2 is a side elevational view similar to FIG. 1 showing the shifting tool oriented relative to the valve seat in the side pocket and released from the support for insertion into the valve seat, FIG. 3 is a view similar to FIG. 2 showing the valve being inserted into the valve seat.

DESCRIPTION OF THE PREFERRED EMBODIMENT

Figure 4A:
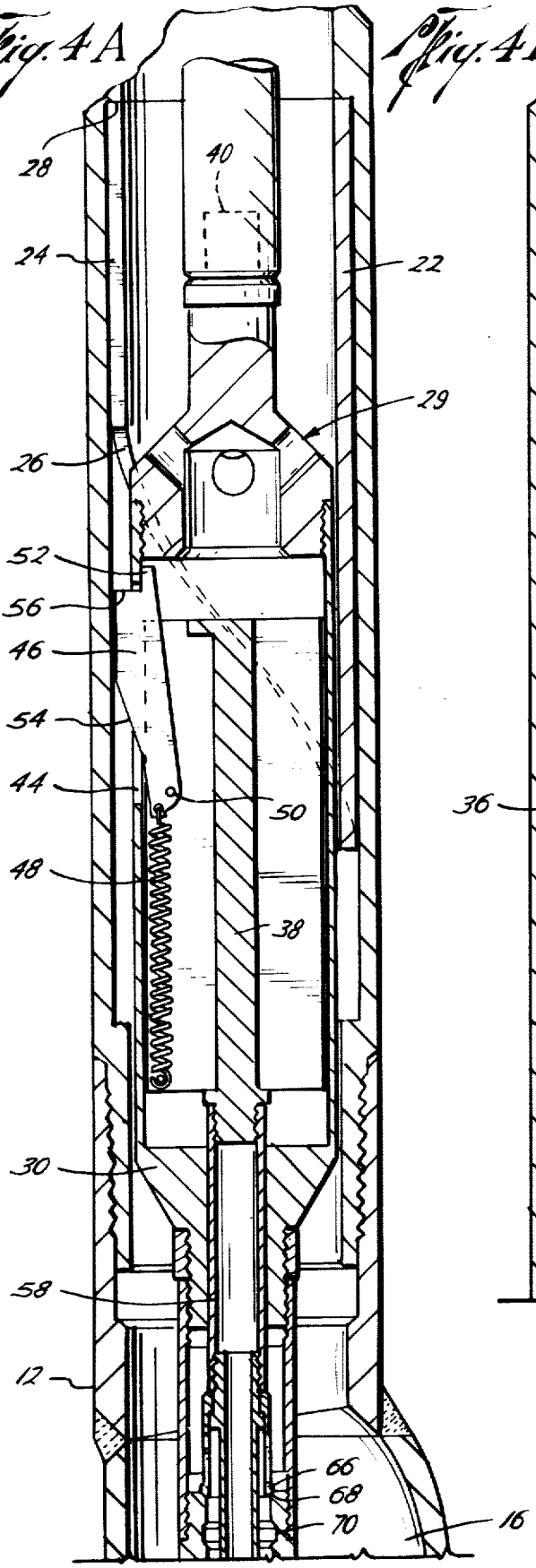
FIG. 4A is an enlarged elevational view, in cross section showing the top portion of a tubing mandrel and one form of a valve handling apparatus of the present invention in position in a mandrel prior to orientation.

Referring now to the drawings, and particularly to FIG. 1, a well tubing 10 is shown having connected therein vertically spaced mandrels 12, here shown only as one for convenience. Each tubing mandrel 12 includes a main *or open* bore 14 therethrough generally having the same size and aligned with the bore of the well tubing 10, and further includes a side *or valve* pocket 16 whose axis is offset from the main bore 14 and includes a valve seat 18 for receiving a flow control valve 20 therein. Generally, a plurality of mandrels 12 are connected in the tubing 10 one above the other, each of which is adapted to receive a flow control valve. A shifting tool is generally employed and is lowered generally on a wire line to install or remove a flow valve 20 in or from the seat 18.

The present invention is directed to a well installation whereby an apparatus is provided for selectively installing or removing a valve in or from the desired vertically positioned mandrel 12, and orientating the shifting tool 16 relative to the side pocket 16 for aligning a valve handling support with the valve seat 18.

Thus referring to FIGS. 1–4 a guide *or orientation* sleeve 22 is provided positioned aligned with the main bore 14 and preferably positioned above the side pocket 16 *preferably in an annular recess in the wall of the open bore 14. The sleeve 22 is positioned or mounted in the recess with its internal surface parallel to and the same diameter as the internal surface of the open bore 14. Thus, the internal surfaces of the open bore 14 and sleeve 22 are coextensive at the upper end of the sleeve.* The guide sleeve includes a longitudinal guide slot 24, a guide surface 26 positioned below the slot 24 and directed inwardly and upwardly towards the bottom of the slot 24 for guiding a key upwardly and into the slot 24, and an actuating shoulder 28 positioned at the top of and entirely blocking the slot for preventing upward movement of the said key through the slot for actuating a valve handling apparatus all of which will be more fully described hereinafter. The slot 24 is angularly spaced from the axis of the offset pocket 16 a predetermined amount for rotating and orientating a valve handling apparatus 29 relative to the side pocket for installing or removing a valve therefrom.

The valve handling apparatus 29 generally includes a support body generally indicated by the numeral 30, a shifting tool 32 which is pivotally supported from the support body 30, a valve handling support 34 which is pivotally carried by the shifting tool 32, and an elongate guide case 36, and a longitudinally movable body 38 carried by the support body 30.

The support body 30 includes any suitable means for moving the apparatus 29 through the tubing 10 and mandrels 12 such as a hydraulic pump or as shown, for example only, a connection 40 for attachment to a wire line. A guide key 46 is pivotally connected to the movable support body 38 at its lower end by shear pin 50. The support body 30 also may include an outer case 42 enclosing the movable body 38 and having an opening 44 through which the guide key 46 is yieldably urged outwardly by a spring 48. A retaining shoulder 52 may be provided on the key 46 to engage the inside of the case 42 if desired to prevent the key 46 from being extended outwardly too great a distance and becoming damaged as it passes through various size areas. However, it will be noted that while the guide key 46 is yieldably urged outwardly at all times that it will, because of the downwardly facing tapering face 54, will readily pass downwardly over protruding shoulders inside the main bore 14 including any number of orientation sleeves 22. It is also noted that the width of the key 46 is such as to fit in the slot 24 of the orientation sleeve 22. The key 46 also includes an upwardly directed actuating shoulder 56 which when the key 46 is below the guide surface 26 will contact the downwardly directed guide surface thereby rotating the valve handling apparatus 29 and rotatably align the apparatus 29 in the well bore as the guide key 46 moves along the guide surface 26 and into the longitudinal guide slot 24. Further upward movement of the valve handling apparatus 29 will bring the shoulder 56 of the guide key 46 into engagement with the actuating shoulder 28 thereby stopping further upward movement of the movable body 38.

Figure 4B:
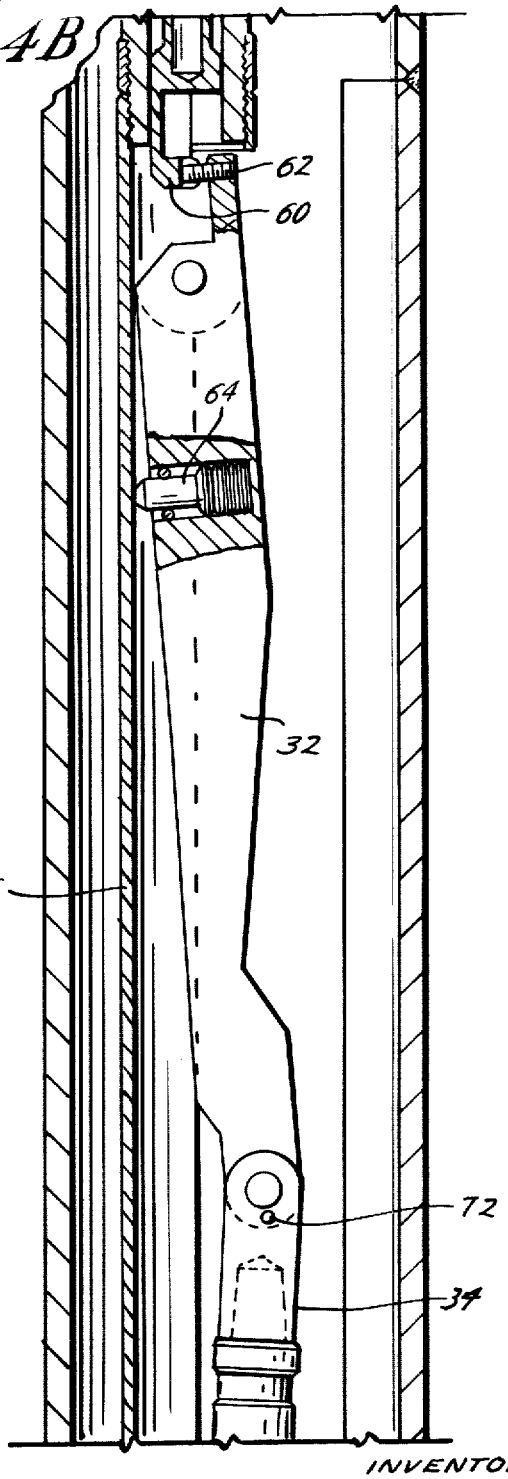
FIG. 4B is a continuation of FIG. 4A.
Figure 5A:
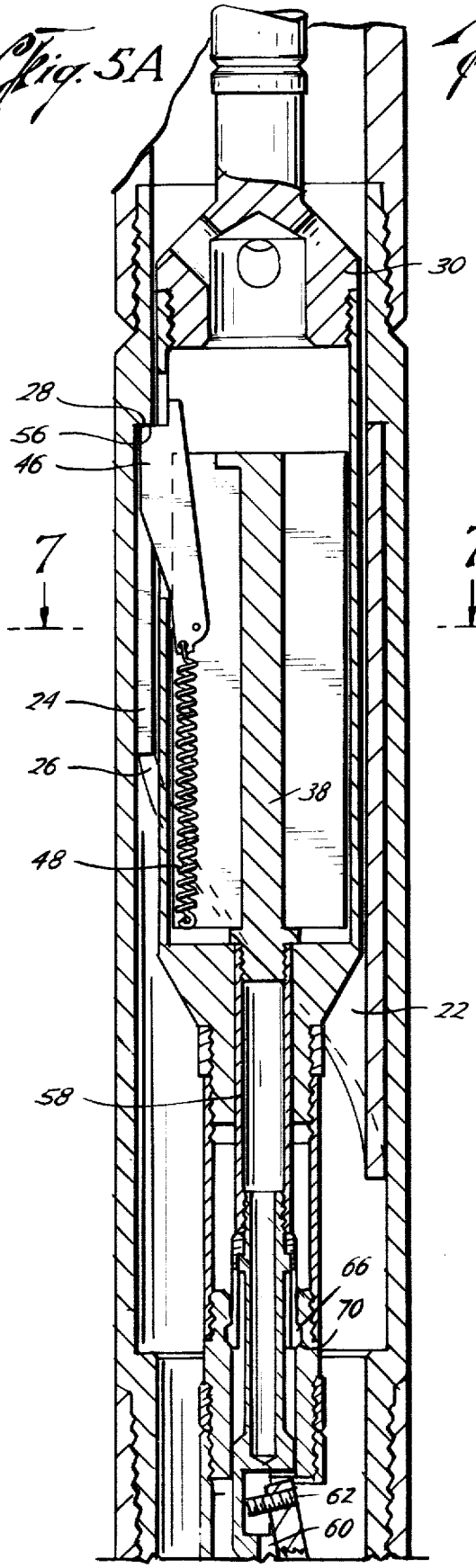
FIG. 5A is an enlarged cross-sectional view of the top portion of the valve handling apparatus of FIGS. 4A and 4B aligned in the orientation sleeve of the tubing mandrel, and actuated to move the shifting tool and valve handling support into position over the valve seat.
Figure 5B:
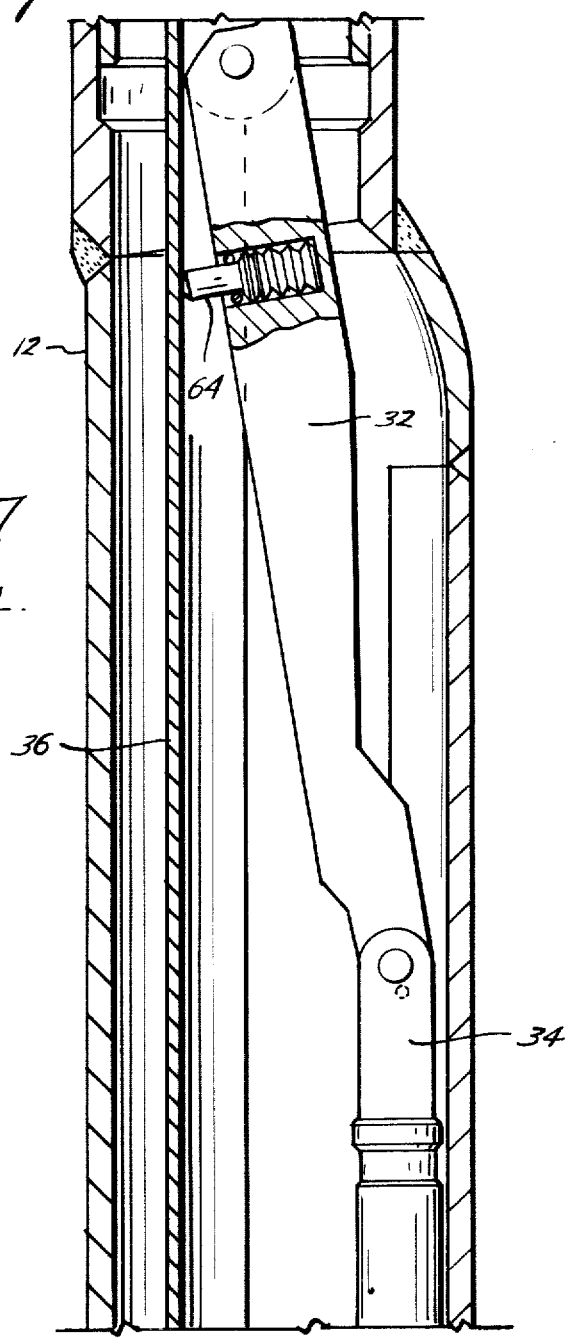
FIG. 5B is a continuation of FIG. 5A.

A rod 58 is connected to the movable body 38 and is longitudinally slidable therewith relative to the support body 30. Suitable engaging means such as a shoulder 60 is connected to the lower end of the rod 58 for engaging a portion of the shifting tool 32 such as pin 62 to keep the tool 32 initially aligned within the guide case 36 and thus aligned with the main bore 14 and the tubing 10 as the apparatus is initially moved down the well bore (FIGS. 4A and 4B). However, as best seen in FIGS. 5A and 5B, when the desired mandrel is reached in which it is desired to install or remove a valve 20 and the guide key 46 is moved upwardly into the selected guide slot 24 and against the actuating shoulder 28 preventing further upward movement of movable body 38, further upward movement of the support body 30 will disengage the engaging means 60 as the pin 62 moves upwardly past the shoulder 60 allowing the spring loaded plunger 64 which acts against the inside of the guide case 36 to shift the shifting tool 32 and the valve handling support 34 over into the side pocket and because the guide key 24 is oriented in the guide slot 24 and the valve handling support 34 will be aligned over the valve seat 18.

Releasable means for initially preventing longitudinal movement between the support body 30 and the movable body 38 are provided such as a collet 66 on the rod 58 which normally engages a shoulder 68 (FIG. 4A) on the support body 30 to initially position the support body 30 and the movable body 38 relative to each other and to keep the engaging shoulder 60 in engagement with the pin 62. However, as best seen in FIG. 5A when the support body 30 is moved upwardly relative to the movable body 38 to release the shifting tool 32, the collet 66 moves past the shoulder 68 and into a groove 70 to releasably secure the movable body 38 to the support body 30.

For installing a flow control valve 20, a suitable running adapter 74 such as the type JC-3 sold by Camco, Incorporated of Houston, Texas, and as more fully described in U.S. Pat. No. 3,353,608 may be used. With the release of the shifting tool 32 and its movement outwardly and above the valve seat 18 and valve handling apparatus 29 may be lowered to cause the lower end of the valve 20 to move into the valve seat 18. The pivoted connection 71 between the shifting tool 32 and the valve handling support 34 allows the valve 20 to become vertically aligned with the valve seat 18 and further downward movement or jarring of the apparatus 29 shears the pin 72 (FIG. 3) and allows the valve handling support 34 and adapter 74 to become aligned with the valve seat 18 and further downward movement seats the valve 20 in the valve seat 18.

Figure 6:
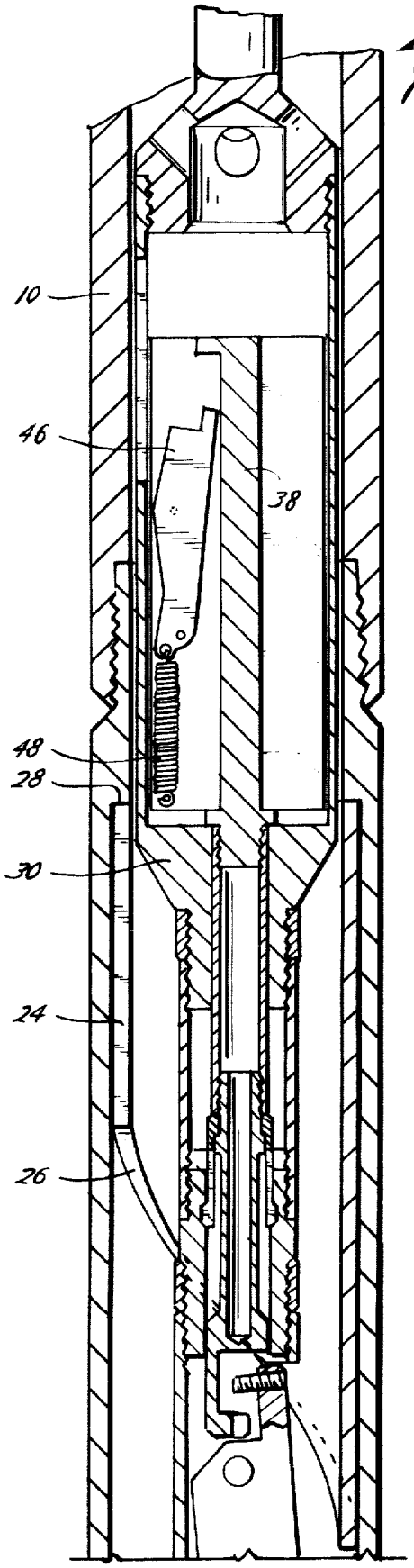
FIG. 6 is an enlarged elevational view, in cross section of the top portion of the tubing mandrel and valve handling apparatus of FIGS. 4A and 4B after the guide key has been sheared and the apparatus is being withdrawn from the well tubing.
Figure 7:
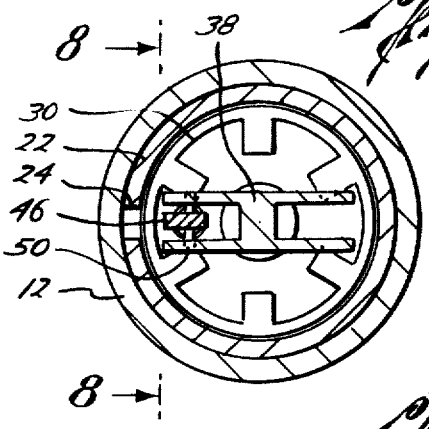
FIG. 7 is a cross-sectional view taken along the line 7—7 of FIG. 5A.
Figure 8:
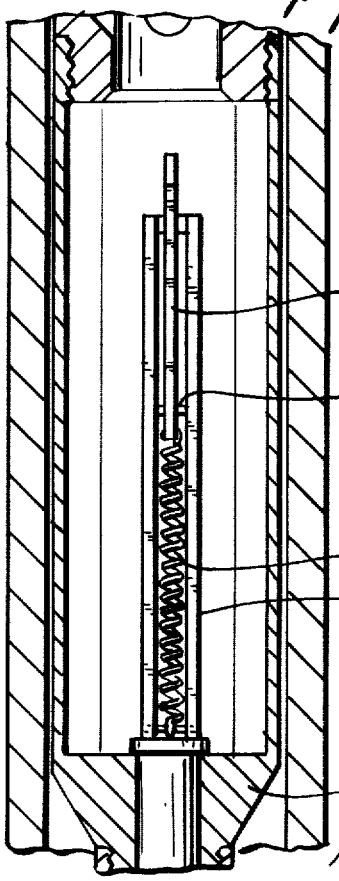
FIG. 8 is a cross-sectional view taken along the line 8—8 of FIG. 7.
Figure 9:
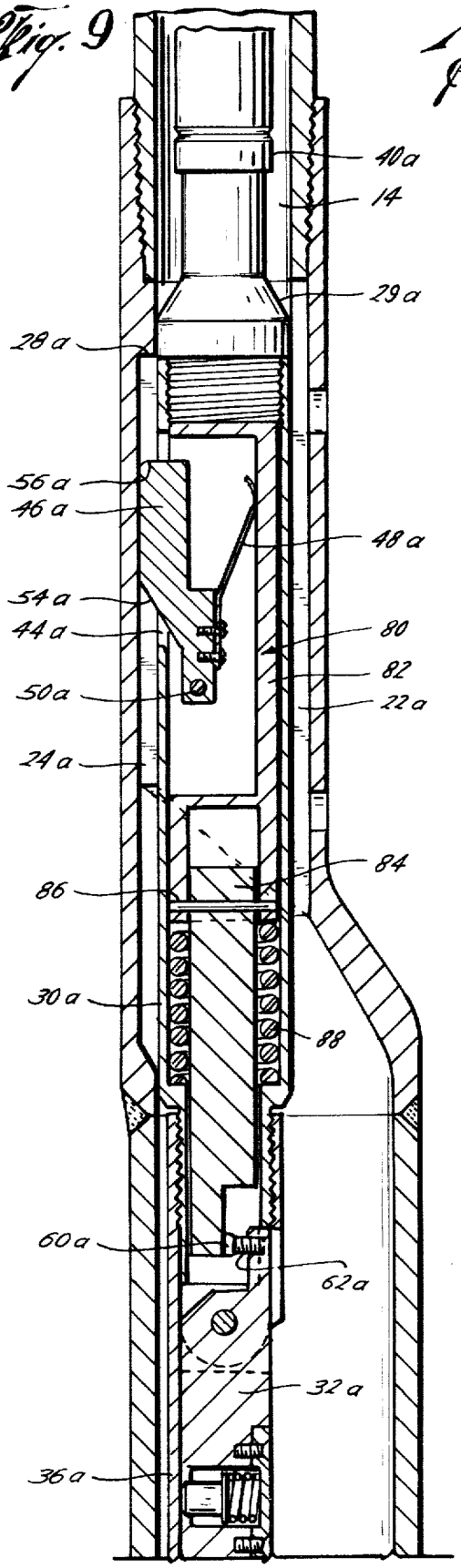
FIG. 9 is a fragmentary elevational view, in cross section, of another embodiment of the present invention having a modified actuating and releasing mechanism to the valve handling apparatus, shown in running position.

After the valve 20 is seated in the valve seat 18 and conventionally disconnected from adapter 74, the apparatus 29 may be withdrawn from the tubing by moving the apparatus 29 upwardly and jarring the guide key 46 against the shoulder 28 to shear the pin 50 thereby allowing the apparatus to be withdrawn through the tubing 10. As best seen in FIG. 6, upon shearing of the pin 50 the spring 48 will retract the key 46 into the outer case 42 so that the key 46 will not contact any further orientating sleeves 22 or other shoulders in the tubing bore.

Of course, the valve handling apparatus 29 of the present invention may also be used to remove a valve 20 from a valve seat in a selected mandrel by utilizing a pulling adapter of any conventional type, such as the type JDC of Camco, Incorporated of Houston as shown in U.S. Pat. No. 3,353,608, in a place of the running adapter 74 and in which event the orientation sleeve 22 would coact with the guide key 46 to suitably orient and guide the pulling adapter over the valve 20 to be removed from the well seat 18.

In operation, the valve handling apparatus 29 of FIGS. 1-8 in use in installing a valve 20 in a preselected valve 18 is assembled as best seen in FIGS. 1, 4A and 4B with the collet 66 on the movable body 38 positioned against the shoulder 68 on the support body 30 thereby holding the engaging shoulder 60 against the pin 62 keeping the shifting tool 32, the valve handling support 34 and the valve 20 positioned against the guide case 36 and thus aligned in the bore of the well tubing 10 and the main bore 14 of the various vertically spaced mandrels 12. With the present invention the various tubing mandrels 12 which are vertically positioned in the tubing 10 may all be identical with the longitudinal guide slots 24 all being angularly spaced the same amount from the axis of the side pocket 16 thereby allowing all of the mandrels 12 to be similarly manufactured, requiring only a minimum of stocking requirements at the place of use as compared to those devices in which the orientation slots are different in each vertically spaced mandrel, and thereby reducing errors in operation because of the simplicity of operation. Thus, the operator may lower the valve handling apparatus 29 downwardly in the tubing 10 to the desired mandrel 12. If the desired mandrel is below other mandrels the guide key 46 will move through the upper orientation sleeves 22 and mandrels since the key 46 is only actuated by an upper movement relative to an orientation sleeve 22 and downward movement therethrough merely allows the upper end of key 46 to be pushed inwardly into the casing 42 of the support body 30. Therefore, the valve handling apparatus 29 is lowered in the well tubing 10 to a position below the orientation sleeve 22 in the mandrel 12 in which it is desired to install or remove a valve 20 (FIGS. 4A and 4B). On reaching the desired location the apparatus 29 is then raised whereby the guide key 46 which is yieldably urged outwardly by the spring 48 engages the guide surface 29 and further upward movement causes the key 46 to rotate and be guided into the guide slot 24 thereby orientating the apparatus 29 with respect to the side pocket 16. Further upward movement will cause the shoulder 56 on the guide key 46 to contact the engaging shoulder 28 above the slot 24 of the orientation sleeve 22 which is then an indication to the operator of the vertical position of the apparatus 29. Further upward movement of the support body 30 relative to the movable body 38 moves the collet 66 past shoulder 68 and into groove 70 and allowing the pin 62 to move upwardly and off of the now stationary engaging shoulder 60 which in turn allows the spring loaded plunger 64 to shift the shifting tool 32 and the valve handling support 34 over into the side pocket above the valve seat 18 (FIGS. 2, 5- and 5B). Downward movement of the apparatus 29 causes the lower end of the valve 20 to 5A into the valve seat and further downward movement shears the shear pin 72 allowing the valve 20 and the valve handling support 34 to become aligned in the valve seat 18 and further downward movement or jarring of the apparatus 29 seats the valve 20 securely in the valve seat 18 and disconnects the running adapter 74 from the valve 20. Of course, as previously mentioned the apparatus will by similar operation, using a pulling adapter in place of the running adapter 74, may remove a valve 20 from the valve seat 18. The apparatus 29 may then be removed from the tubing by upward movement wherein the guide key 46 again engages the slot 24 and the shoulder 28 and by upward jarring action will shear the shear pin 50 allowing the spring 48 to retract the guide key 46 into the interior of the case 42 (FIG. 6) whereby the apparatus 29 may be removed from the tubing past any additional mandrels thereabove.

Of course, various modifications may be made to the valve handling apparatus and a modified embodiment is shown in FIGS. 9 through 12 which operates in an identical orientation sleeve shown in FIGS. 1–8 and which is the same as the valve handling apparatus shown in FIGS. 1–8 with the exception of the actuating and release mechanism, but which allows the valve handling apparatus to be selectively set either while it is moving downhole or to be selectively actuated and oriented and while it is moving uphole in which the parts corresponding to FIGS. 1–8 are similarly numbered with a suffix "a".

The valve handling apparatus 29a generally includes a support body generally indicated by the numeral 30a, a shifting tool 32a which is pivotally supported from the support body 30a and a valve handling support (not shown) which is pivotally carried by the shifting tool 32, as in the embodiment of FIGS. 1–8, and an elongate guide case 36a, and a longitudinally movable body generally indicated by the numeral 80 and carried by the support body 30a and generally includes a first part 82 and a second part 84 which are initially secured together by a shear pin 86.

The support body 30a is adapted to be moved through the tubing 10 and mandrels 12 by any suitable means such as a wire line connection 40a. A guide key 46a is pivotally connected to the movable support body 80 at its lower end by an emergency shear pin 50a which will be more fully discussed hereinafter. Support body 30a also includes an opening 44a through which the guide key 46 is yieldably urged outwardly by a spring 48a. Thus, the guide key 46a is yieldably urged outwardly at all times but because of the downwardly facing tapering face 54a and will readily pass downwardly over protruding shoulders inside the main bore and any number of orienting sleeves 22a. The key 46a also includes an upwardly directed actuating shoulder 56a which when the key 46a is below the guide surface 26a will contact the surface thereby rotating and aligning the valve handling apparatus 29a in the well bore as the guide key 46a moves along the guide surface 26a and into the longitudinal guide slot 24a and into engagement with the actuating shoulder 28a thereby stopping further upward movement of the movable body 80.

Figure 10:
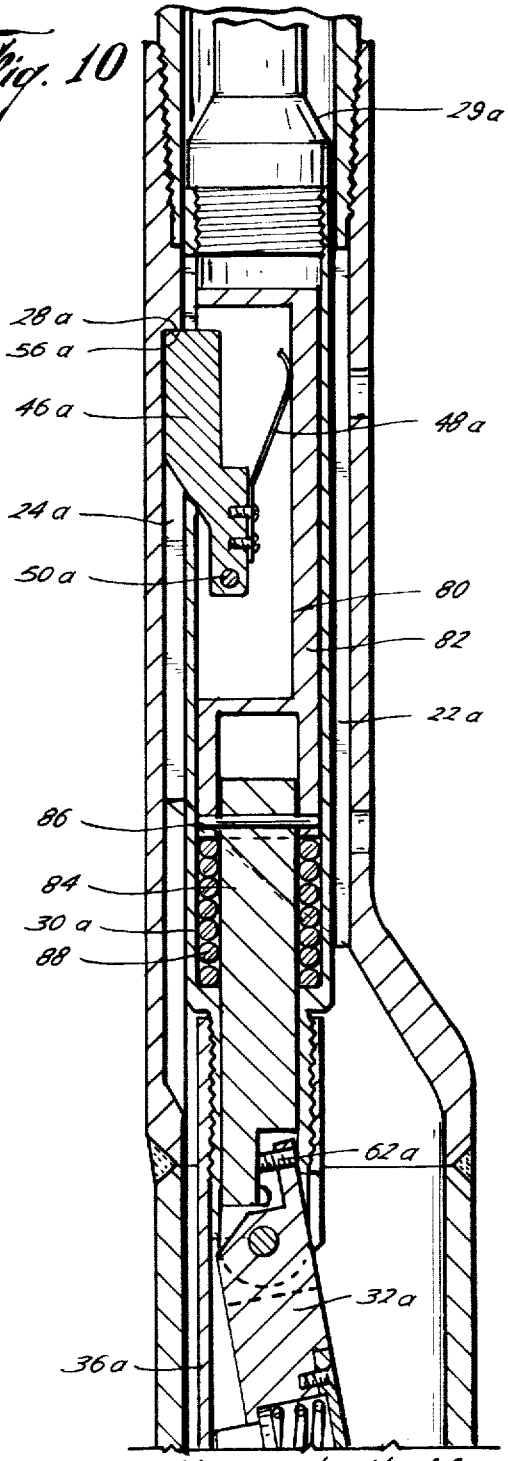
FIG. 10 is a view similar to FIG. 9 showing the modified apparatus in position releasing the shifting tool.

Suitable engaging means such as a shoulder 60a is connected to the lower end of the second part 84 of the movable body 80 for engaging a portion of the shifting tool such as 62a to keep the tool 32a initially aligned within the guide case 36a and thus aligned with the main bore 14 in the tubing 10 as the apparatus is initially moved down the well bore. However, when the apparatus 29a is moved into the desired mandrel in which it is desired to install or remove a valve, and as best seen in FIG. 10, the guide key 46a is moved upwardly into the selected guide slot 24a and the guide key shoulder 56a engages the actuating shoulder 28a preventing further upward movement of the movable body 80 but allowing further upward movement of the support body 30a which will disengage the engaging means or shoulder 60a as the pin 62a moves upwardly past the shoulder 60a allowing the shifting tool 32a to be actuated identical to the embodiment of FIGS. 1–8. After release of tool 32a, a valve may be installed or removed as previously disclosed.

Figure 11:
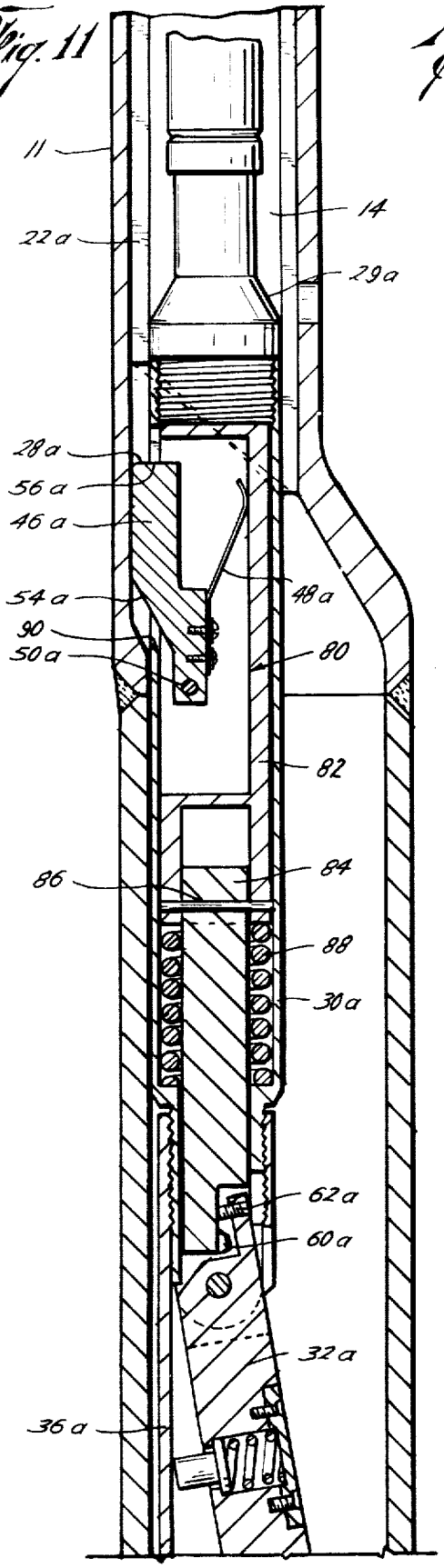
FIG. 11 is a view similar to FIG. 9 showing the modified tool in coming out position to begin releasing the shear pin.

Once a valve has been installed or removed, or even in the event that the apparatus 29a has been run past the desired mandrel and into a lower mandrel, the apparatus 29a may be retracted upwardly either out of the tubing or moved upwardly to an uphole mandrel, in which the work is desired to be performed. That is, as best seen in FIG. 11, as the key 46a is raised in a mandrel, the shoulder 56a will engage shoulder 28a in the sleeve 22a, and the tool 29a will be jarred upwardly shearing shear pin 86. It is to be noted that shear pin 86 has a lower shear point than the emergency shear pin 50a.

Figure 12:
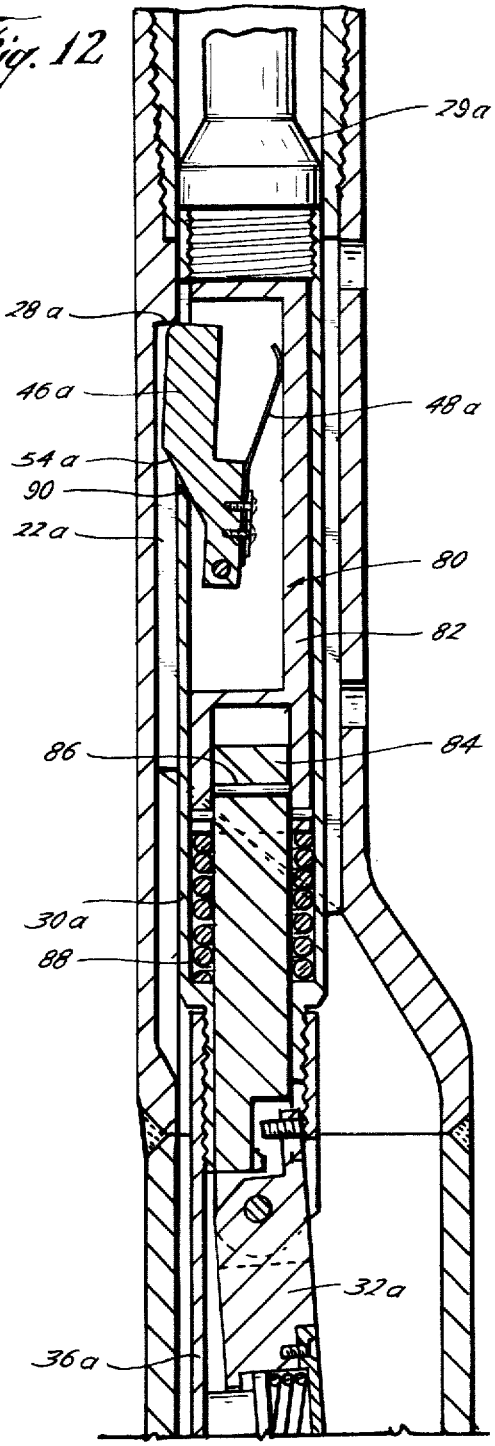
FIG. 12 is a view similar to FIG. 9 showing the modified tool in position retracting the guide key so as to bypass the orientation sleeve.

With the shear pin 86 sheared, and as best seen in FIG. 12, the support body 30a may be moved upwardly relative to the movable body 80 against the action of a resetting spring 88. It is also to be noted that the support body 30a has a retracting shoulder 90 which will engage the tapered surface 54a on the key 46a on upward movement of the support body 30a relative to the first port 82a of the movable body 80 thereby retracting the key 46a into the interior of the case 42a whereby the apparatus 29a may be moved uphole to the next adjacent mandrel thereabove. Because of the action of the resetting spring 88 acting against part 82 of the movable body 80, and the action of spring 48a, the guide key 46a is normally urged outwardly to act in the next adjacent above orienting sleeve so that the apparatus 29a may be actuated in moving uphole if desired. That is, the key 46a will engage each uphole orientation sleeve 22a and rotate and orient the apparatus 29a. However, if it is desired merely to retract the apparatus 29a out of the hole, additional upward movement of the support body 39a relative to the movable body part 82 will again overcome the action of the resetting spring 88 to allow the retracting shoulder 90 to again retract the orienting key 46a into the case 42a and allow continued upward movement out of the hole of the apparatus 29a. If for any reason the key 46a cannot be retracted by the retracting shoulder 90, the apparatus 29a may be further jarred upwardly to shear the emergency shear pin 50a to allow the key 46a to be retracted into the interior of the case 42a as in the case of the embodiment shown in FIGS. 1–8, and the apparatus 29a may be removed. Thus, the embodiments of the valve handling apparatus 29a shown in FIGS. 9–12 may be selectively actuated either when moving downwardly or upwardly in a well bore to install or remove a valve from a valve seat in a selected mandrel.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A well installation comprising, a well tubing having a plurality of tubing mandrels each having a main bore therethrough and a valve receiving side pocket offset from the main bore and including an orientation sleeve mounted in the main bore comprising, each said orientation sleeve including a longitudinally directed slot angularly spaced from the axis of said offset pocket a predetermined amount, said slots being angularly spaced the same amount from said pockets, a guide surface positioned below each said slot and directed upwardly and inwardly towards the bottom of said slot, a shoulder positioned at the top of and blocking each slot, and a valve handling apparatus comprising, a support body adapted to be moved through the tubing and mandrels, a movable body carried by longitudinally movable relative to the support body, a longitudinal guide key having an upwardly directed shoulder and an inwardly directed taper facing downwardly, pivotally carried at its lower end by the movable body for outward movement from the movable body and sized for engagement in said slot whereby said guide key will readily pass downwardly through any number of sleeves to the desired sleeve, but on upward movement will engage the first slot and shoulder encountered, a shifting tool pivotally supported from the support body and adapted to support a valve handling support, releasing means on said movable body initially holding the shifting tool aligned in the main bore, and shifting means connected to the shifting tool for shifting the shifting tool into the side pocket when the releasing means is actuated.

2. The apparatus of claim 1 including means normally preventing longitudinal movement between the support body and the movable body.

3. The apparatus of claim 1 wherein the key is pivotally supported by a shear pin.

4. The apparatus of claim 3 including, said movable body including a recess into which the guide key is received when the shear pin is broken.

5. A well installation comprising, a well tubing having a plurality of tubing mandrels each having a main bore therethrough and a valve receiving pocket offset from the main bore and including an orientation sleeve mounted in the main bore for coacting with a valve handling apparatus having a guide key, each said sleeve including a longitudinally directed orientation slot angularly spaced from the axis of the offset pocket a predetermined amount, said slots of each sleeve being angularly spaced the same amount from the axis of said pockets, a guide surface positioned below each said slot and directed upwardly and inwardly towards the bottom of said slot for receiving said guide key in said slot and orientating the valve handling apparatus, and a shoulder positioned at the top of and entirely blocking the slot for preventing upward movement of said key through the slot for actuating the valve handling apparatus.

6. The combination of claim 5 of a well valve handling apparatus adapted for use in placing a valve in or removing a valve from desired pockets comprising, a support body adapted to be moved in the well tubing and mandrels, a shifting tool pivotally supported from the support body and adapted to support a valve handling support, a movable body carried by the support body, a longitudinal guide key pivotally secured to the movable body at the lower end of the key by shear pin, said key sized to become engaged in said orientation slot, spring means yieldably urging said guide key outwardly for engagement in the slot of the desired sleeve but allowing said key to bypass sleeves above the desired location, releasing means on said movable body initially holding the shifting tool aligned in the main bore but releasable on upward movement of the support body relative to the movable body when the key is contacting said shoulder, and shifting means connected to the shifting tool for shifting the shifting tool into the side pocket when the releasing means is released.

7. A well valve handling apparatus adapted for use in placing a valve in or removing a valve from a well tubing having a plurality of tubing mandrels each having a main bore therethrough and a valve receiving pocket offset from the main bore and including an orientation sleeve mounted in the main bore having a longitudinal orientation slot and a shoulder at the top of said slot, comprising, a support body adapted to be moved in the tubing, a movable body carried by and longitudinally slidable movable relative to the support body, a guide key pivotally connected by a shear pin adjacent its lower end to the movable body, spring means yieldably urging said guide outwardly for engagement in the longitudinal orientation slot of the desired mandrel but allowing said guide to downwardly bypass sleeves above the desired location, a shifting tool pivotally supported from the support body and adapted to support a valve support apparatus, releasing means on said movable body initially holding the shifting tool aligned in the main bore but releasable on movement of the movable body relative to the support body, and shifting means connected to the shifting tool for shifting the shifting tool into the side pocket when the releasing means is released.

8. A well valve handling apparatus adapted for use in placing a valve in or removing a valve from a well tubing having a plurality of tubing mandrels each having a main bore therethrough and a valve receiving pocket offset from the main bore and including an orientation sleeve mounted in the main bore having a longitudinal slot and a shoulder at the top of said slot, comprising, a support body adapted to be moved in the well tubing, a movable body carried by and longitudinally movable relative to the support body, a guide key pivotally connected to the movable body having an upwardly directed shoulder and an inwardly directed taper facing downwardly, spring means yieldably urging said guide outwardly for engagement in the longitudinal orientation slot of the desired mandrel but allowing said guide to downwardly bypass sleeves above the desired location, a key retracting shoulder on the support body for retracting the key when the support is moved toward the movable body, spring means between said support body and said movable body yieldably urging said movable body away from the support body and thereby urging the key out of contact with the retracting shoulder, a shifting tool pivotally supported from the support body and adapted to support a valve support apparatus, releasing means on said movable body initially holding the shifting tool aligned in the main bore but releasable on movement of the movable body relative to the support body, and shifting means connected to the shifting tool for shifting the shifting tool into the side pocket when the releasing means is released.

9. The apparatus of claim 8 including means normally preventing longitudinal movement between the support body and the movable body.

10. The apparatus of claim 8 wherein the movable body includes, first and second parts connected together with a shear pin adapted to be sheared when the valve handling apparatus is raised past a shoulder in a sleeve.

11. The apparatus of claim 8 wherein the key is pivotally supported adjacent its lower end by a shear pin.

12. The apparatus of claim 11 including, said movable body including a recess into which the guide key is received when the shear pin is broken.

13. A well installation comprising, a well tubing having a plurality of tubing mandrels each having a main bore therethrough and a valve receiving pocket offset from the main bore and including an orientation sleeve mounted in the main bore for coacting with a valve handling apparatus having a guide key comprising, each such sleeve including a longitudinally directed orientation slot angularly spaced from the axis of the offset pocket a predetermined amount, said slots of each sleeve being angularly spaced the same amount from the axis of said pocket, a guide surface positioned below such slot and directed upwardly and inwardly towards the bottom of the slot for receiving said guide key in said slot and orientating the valve handling apparatus, and a shoulder positioned at the top of and entirely blocking each slot for preventing upward movement of said key through the slot for actuating the valve handling apparatus, and a valve handling apparatus comprising, a support body adapted to be moved in the well tubing, a movable body carried by and longitudinally movable relative to the support body, a guide key pivotally connected to the movable body having an upwardly directed shoulder and an inwardly directed taper facing downwardly, spring means yieldably urging said guide outwardly for engagement in the longitudinal orientation slot of the desired mandrel but allowing said guide to move downwardly to bypass sleeves above the desired location, a key retracting shoulder on the support body for retracting the key when the support body is moved towards the movable body, spring means between said support body and said movable body yieldably urging said movable body from the support body and thereby urging the key out of contact with the retracting shoulder, a shifting tool pivotally supported from the support body and adapted to support a valve support apparatus, releasing means on the movable body and initially holding the shifting tool aligned in the main bore but releasable on movement of the movable body relative to the support body, and shifting means connected to the shifting tool for shifting the shifting tool into the side pocket when the releasing means is released.

14. The apparatus of claim 13 wherein the movable body includes, first and second parts connected together with a shear pin adapted to be sheared when the valve handling apparatus is raised past a shoulder and a sleeve.

*15. A tubing mandrel for use in a well tubing comprising,*

*a mandrel body having connecting means at each end for connection in a well tubing and having an open bore for alignment with the well tubing,*

*a valve pocket positioned in the body offset from the open bore,*

*a guide sleeve positioned in the open bore adjacent the pocket, said sleeve mounted in said open bore with the upper end of said guide sleeve recessed in the wall of the open bore whereby interfering contact between the upper end of the sleeve and objects moving downward through the open bore is prevented; said sleeve including a longitudinally directed orientation slot in said sleeve and angularly spaced from the axis of the pocket a predetermined amount,*

*a guide surface positioned below such slot and directed upwardly toward the bottom of the slot for orientating a valve handling apparatus relative to the pocket, and*

*a downwardly directed actuating shoulder in the body above the pocket for actuating a valve handling apparatus.*

*16. A tubing mandrel for use in a well tubing comprising,*

*a mandrel body having connecting means at each end for connection in a well tubing and having an open bore for alignment with the well tubing, a recess formed in the wall of the open bore;*

*a valve pocket positioned in the body offset from the open bore,*

*a guide sleeve mounted in the recess in the wall of the open bore adjacent the pocket with the internal surface of the sleeve coextensive with the internal surface of the open bore, said sleeve including a longitudinally directed orientation slot in said sleeve and angularly spaced from the axis of the pocket a predetermined amount,*

*a guide surface positioned below such slot and directed upwardly toward the bottom of the slot for orientating a valve handling apparatus relative to the pocket, and*

*a downwardly directed actuating shoulder in the body above the pocket for actuating a valve handling apparatus.*

*17. The mandrel of claim 16 wherein said sleeve is positioned with its internal surface coextensive with the internal surface of said open bore adjacent the upper end of said sleeve.*

*18. A tubing mandrel for use in a well tubing comprising,*

*a mandrel body having connecting means at each end for connection in a well tubing and having an open bore for alignment with the well tubing,*

*a valve pocket positioned in the body offset from the open bore,*

*a guide sleeve positioned in the open bore adjacent the pocket, said sleeve mounted in said open bore with the internal surface of the sleeve being parallel to and having a diameter at least as large as the internal surface of said open bore; said sleeve including a longitudinally directed orientation slot in said sleeve and angularly spaced from the axis of the pocket a predetermined amount,*

*a guide surface positioned below such slot and directed upwardly toward the bottom of the slot for orientating a valve handling apparatus relative to the pocket, and*

*a downwardly directed actuating shoulder in the body above the pocket for actuating a valve handling apparatus.*

* * * * *